United States Patent
Ahn et al.

(10) Patent No.: US 7,540,924 B2
(45) Date of Patent: Jun. 2, 2009

(54) SEALANT DISPENSER AND CONTROL METHOD THEREOF

(75) Inventors: Man Ho Ahn, Gumi (KR); Joon Young Kim, Gumi (KR)

(73) Assignee: Top Engineering Company, Kumi (KR)

(*) Notice: Subject to any disclaimer, the term of this patent is extended or adjusted under 35 U.S.C. 154(b) by 256 days.

(21) Appl. No.: 11/125,528

(22) Filed: May 10, 2005

(65) Prior Publication Data
US 2005/0269375 A1    Dec. 8, 2005

(30) Foreign Application Priority Data
May 12, 2004    (KR)    ........... 10-2004-0033395

(51) Int. Cl.
*B05C 11/10*    (2006.01)
(52) U.S. Cl. .............. 118/669; 118/712; 118/713; 156/356; 156/357; 156/378; 156/379
(58) Field of Classification Search .......... 156/356, 156/357, 378, 379; 118/669, 712, 713
See application file for complete search history.

(56) References Cited

U.S. PATENT DOCUMENTS

| | | | | |
|---|---|---|---|---|
| 5,921,836 A | * | 7/1999 | Nanto et al. | ............ 445/24 |
| 5,932,012 A | * | 8/1999 | Ishida et al. | ............ 118/669 |
| 6,023,323 A | * | 2/2000 | Kato et al. | ............ 356/5.06 |
| 2003/0101930 A1 | * | 6/2003 | Sohn et al. | ............ 118/300 |
| 2004/0131758 A1 | * | 7/2004 | Jung et al. | ............ 427/8 |

FOREIGN PATENT DOCUMENTS

| | | |
|---|---|---|
| JP | 64-015295 | 1/1989 |
| JP | 08-094984 | 4/1996 |
| JP | 09-001026 | 1/1997 |
| JP | 09-173938 | 7/1997 |
| JP | 09-323056 | 12/1997 |
| JP | 11-033458 | 2/1999 |
| JP | 2002-126602 | 5/2002 |
| JP | 2003-084291 | 3/2003 |
| JP | 2003-001170 | 7/2003 |
| JP | 2003-211046 | 7/2003 |
| KR | 2003-0051398 | 5/2003 |

OTHER PUBLICATIONS

Japanese Search Report Aug. 26, 2008.

* cited by examiner

*Primary Examiner*—George R Koch, III
(74) *Attorney, Agent, or Firm*—Ked & Associates LLP

(57) ABSTRACT

Disclosed is a sealant dispenser for more precisely dispensing a sealant onto a substrate, and a control method thereof. The sealant dispenser includes a stage on which a substrate is mounted; a nozzle for dispensing a sealant while making a relative motion with the substrate; a syringe coupled to the nozzle, for storing the sealant; and a distance sensor installed on both sides of a lower portion of the syringe, for measuring a vertical distance between a principal plane of the substrate and an outlet of the nozzle. According to the principles of the present invention, because the nozzle and the syringe have substantially the same central axis, the response speed of the sealant to be dispensed is increased and the start point and the end point of paste pattern are more precisely dispensed. Also, by minimizing the distance between the nozzle and a measuring point provided by the distance sensor, it becomes possible to dispense the sealant at higher precision.

5 Claims, 5 Drawing Sheets

SEALANT DISPENSER AND CONTROL METHOD THEREOF

RELATED APPLICATION

This application claims the benefit of the Korean Patent Application No. P2004-0033395, filed on May 12, 2004, which is hereby incorporated by reference as if fully set forth herein.

BACKGROUND OF THE INVENTION

1. Field of the Invention

The present invention relates in general to a sealant dispenser, and more specifically, to a sealant dispenser for more precisely applying (or dispensing) a sealant onto a substrate, and a control method thereof.

2. Background of the Related Art

In general, liquid crystal display (LCD) is lighter and smaller by volume than a traditional image display device using cathode-ray tube (CRT). Therefore, making great strides in recent years, LCD has been widely applied in many display devices, such as computer monitors and TVs.

In case of the LCD, there is a certain space between an upper substrate and a lower substrate, and the space is filled with liquid crystal. In order for the LCD to perform its operation at optimum state, a cell gap of the lower and upper substrates should be maintained uniformly. In addition, in order to prevent excessive liquid crystal dispensing or insufficient filling of the space, it is very important to have a good positioning precision of a sealant coating for sealing the upper and lower substrates, and a proper control on the amount of coating being supplied to the substrates. This is because if the cell gap is not uniform or if liquid crystal is applied too much or insufficiently, the screen uniformity over the entire screen of an LCD will be deteriorated.

A sealant used to seal the space between the lower and the upper substrate not only maintains a uniform cell gap, but also seals the upper and the lower substrate.

A sealant is applied to a substrate by means of a sealant dispenser. The sealant dispenser includes a stage on which the substrate is mounted, and a head unit provided with a nozzle for discharging the sealant.

Here, the nozzle makes a relation motion to the substrate, and applies a sealant of a designated shape onto the substrate. In other words, the nozzle moves into X-axis and Y-axis directions relatively to the substrate, and applies the sealant onto the substrate. Also, the nozzle is movable into Z-axis direction to adjust its height with respect to the substrate.

FIG. 1 illustrates a head unit of a related art sealant dispenser.

As can be seen in the drawing, the head unit of the sealant dispenser includes a syringe 20 for storing a sealant, and a nozzle 32 coupled to a lower portion of the syringe 20, for discharging the sealant 50.

A long bar-shaped bracket 30 is connected to the syringe 20 in a horizontal direction, and the nozzle is installed on the end of the bracket 30. And, a distance sensor 40 for measuring a vertical distance between the nozzle 32 and the substrate 10 is installed in the vicinity of the nozzle 32.

More specifically, the distance sensor 40 is spaced apart a predetermined distance (L) from the syringe 20 which is filled with the sealant. Here, the syringe 20 and the distance sensor 40 must be installed in parallel because of their own volumes. Therefore, in order to put the nozzle communicated with the syringe as close as possible to the focal point of the distance sensor, the syringe and the nozzle must be installed in 'L' shape.

Usually, an optical laser distance sensor is used for the distance sensor 40. The bottom surface of the distance sensor has a "∧", where a light emitting part 42 for emitting a laser beam 46 is installed on one side and a light receiving part 44 for receiving a laser beam 46 is on the other side.

Here, the light emitting part 42 emits a laser beam 46 towards the substrate, whereas the light receiving part 44 receives the laser beam reflected from the substrate. As such, the distance sensor 40 measures a distance between the substrate 10 and the nozzle 32.

When the laser beam path is changed due to a flexure on the sealant-applied surface of the substrate 10, the distance sensor measures the laser beam received to the light receiving part and transfers its measured value to a controller (not shown).

However, the related art sealant dispenser has the following problems.

Firstly, since the nozzle and the syringe are spaced a designated distance apart, the flow path of the sealant is bent in "L" shape. In detail, the distance sensor and the syringe of the related sealant dispenser are separately installed in the head unit while maintaining a designated distance from each other. This is why the flow path of the sealant has an "L" shape.

In that light, the related art dispenser requires a high pressure for discharging the sealant, and the usage of a highly viscous sealant was limited.

Secondly, according to the related art sealant dispenser, the nozzle is installed on the lower portion of the bracket, so that there is a great distance between the position on the substrate where the sealant is discharged and the position on the substrate where a laser beam is reflected. Therefore, the distance sensor cannot get an accurate a vertical distance from the point to which the sealant is actually discharged to the nozzle.

Thirdly, since the flow path of the sealant in the related art sealant dispenser is in "L" shape, the sealant is relatively slowly discharged. Hence, it is not clear exactly where sealant dispensing starts and ends.

SUMMARY OF THE INVENTION

Accordingly, the present invention is directed to a lighting optical system that substantially obviates one or more problems due to limitations and disadvantages of the related art.

An object of the present invention is to provide a sealant dispenser featuring a low pressure for dispensing the sealant, and a control method thereof.

Another object of the present invention is to provide a high precision sealant dispenser and a control method thereof.

Still another object of the present invention is to provide a sealant dispenser featuring an accurate control over the dispensing position and dispensing amount of a sealant by increasing the response speed of a sealant to be dispensed, and a control method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a sealant dispenser, including: a stage on which a substrate is mounted; a nozzle for dispensing a sealant while making a relative motion with the substrate; a syringe coupled to the nozzle, for storing the sealant; and a distance sensor installed on both sides of a lower portion of the syringe, for measuring a vertical distance between a principal plane of the substrate and an outlet of the nozzle.

Preferably, the distance sensor includes: a light emitting part for emitting a laser beam towards the substrate; a light receiving part for receiving a laser beam reflected from the substrate; and a sensor supporting part for supporting the light emitting part and the light receiving part.

Preferably, the sensor supporting part includes a coupling hole that the nozzle passes through.

More preferably, the coupling hole is disposed between the light emitting part and the light receiving part.

Preferably, the syringe and the outlet of the nozzle have substantially the same central axis.

More preferably, a focal point of a laser beam emitted form the distance sensor, the nozzle, and the syringe are arranged on the same axis Preferably, the light emitting part and the light receiving part of the distance sensor are aligned in a straight line along the principal plane of the substrate, and the light emitting part and the light receiving part are combined as one body.

Preferably, the vertical distance between the substrate and the nozzle is maintained at a constant value.

Another aspect of the present invention provides a sealant dispenser, including: a stage on which a substrate is mounted; a nozzle for dispensing a sealant while making a relative motion with the substrate; a distance sensor for measuring a vertical distance between a principal plane of the substrate and an outlet of the nozzle; and a position detecting sensor for detecting a horizontal position of the nozzle on the principal surface of the substrate.

Preferably, the position detecting sensor and the nozzle are located each other at the opposite sides with respect to the substrate.

Preferably, the sealant dispenser further includes an adjusting part for adjusting the position of a syringe storing the sealant.

Preferably, a measuring point on the principal plane of the substrate in which a laser beam from the distance sensor is reflected is disposed on a front end of the nozzle along the direction of the sealant application.

More preferably, the nozzle and the measuring point maintain a minimum distance from each other so that the laser beam does not interfere with the sealant.

Still another aspect of the present invention provides a control method of a sealant dispenser, which the method includes the steps of: in a position detecting sensor installed below a substrate, setting a horizontal position of a nozzle on a principal plane of the substrate; in a distance sensor installed on both sides of a lower portion of a syringe, setting a vertical distance between the substrate and the nozzle; and dispensing a sealant to the position being set.

Preferably, the step for setting the horizontal position of the nozzle includes the sub-step of: measuring a horizontal distance between a measuring point on the substrate in which a laser beam is reflected and the nozzle; and deciding whether the measured horizontal distance falls within a predetermined allowable range.

Preferably, the method further includes the step of: if the measured horizontal distance is outside the allowable range, revising the horizontal position of the nozzle.

Preferably, the step for setting the vertical distance between the substrate and the nozzle includes the sub-steps of: measuring a vertical distance between the substrate and the nozzle; and deciding whether the measured vertical distance falls within a predetermined allowable range.

Preferably, the method further includes the step of: if the measured vertical distance is outside the allowable range, revising the vertical distance between the nozzle and the substrate.

Preferably, the vertical distance between the substrate and the nozzle is revised to maintain a constant value.

Preferably, the syringe and the nozzle for dispensing the sealant to the principal plane of the substrate have substantially the same central axis.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
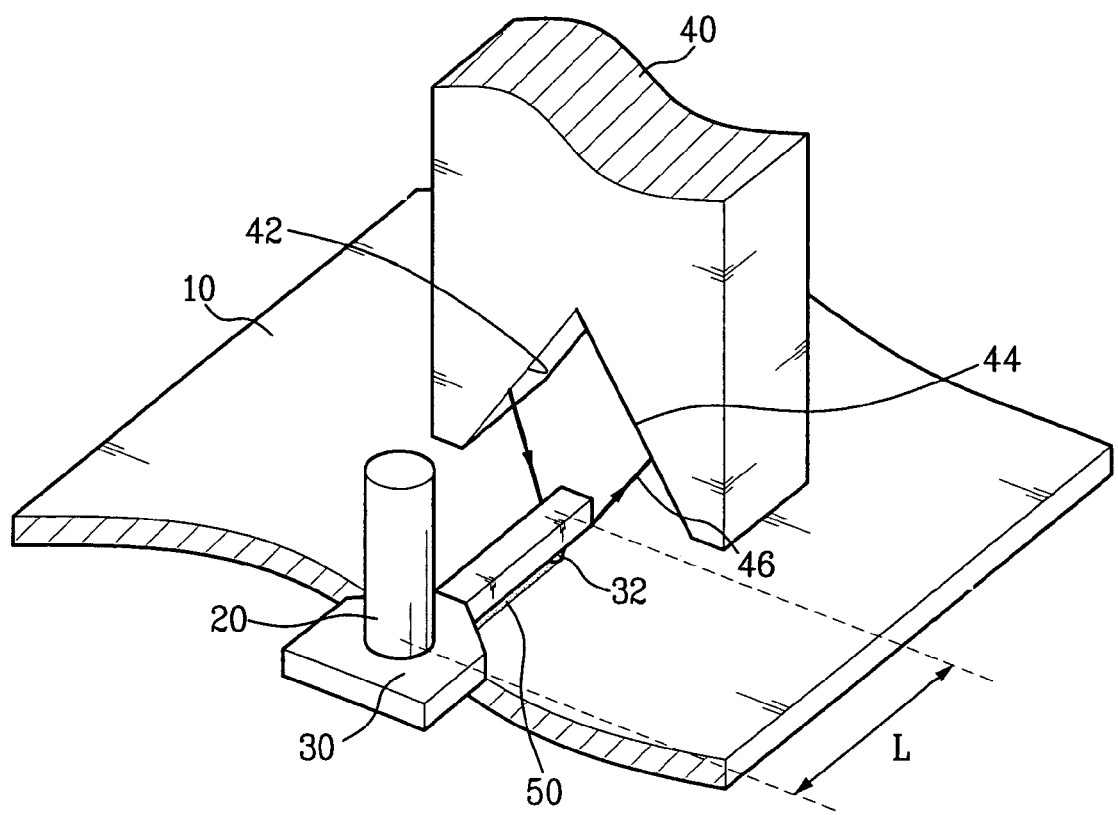
FIG. 1 is a perspective view illustrating a head unit of a related art sealant dispenser.
Figure 2:
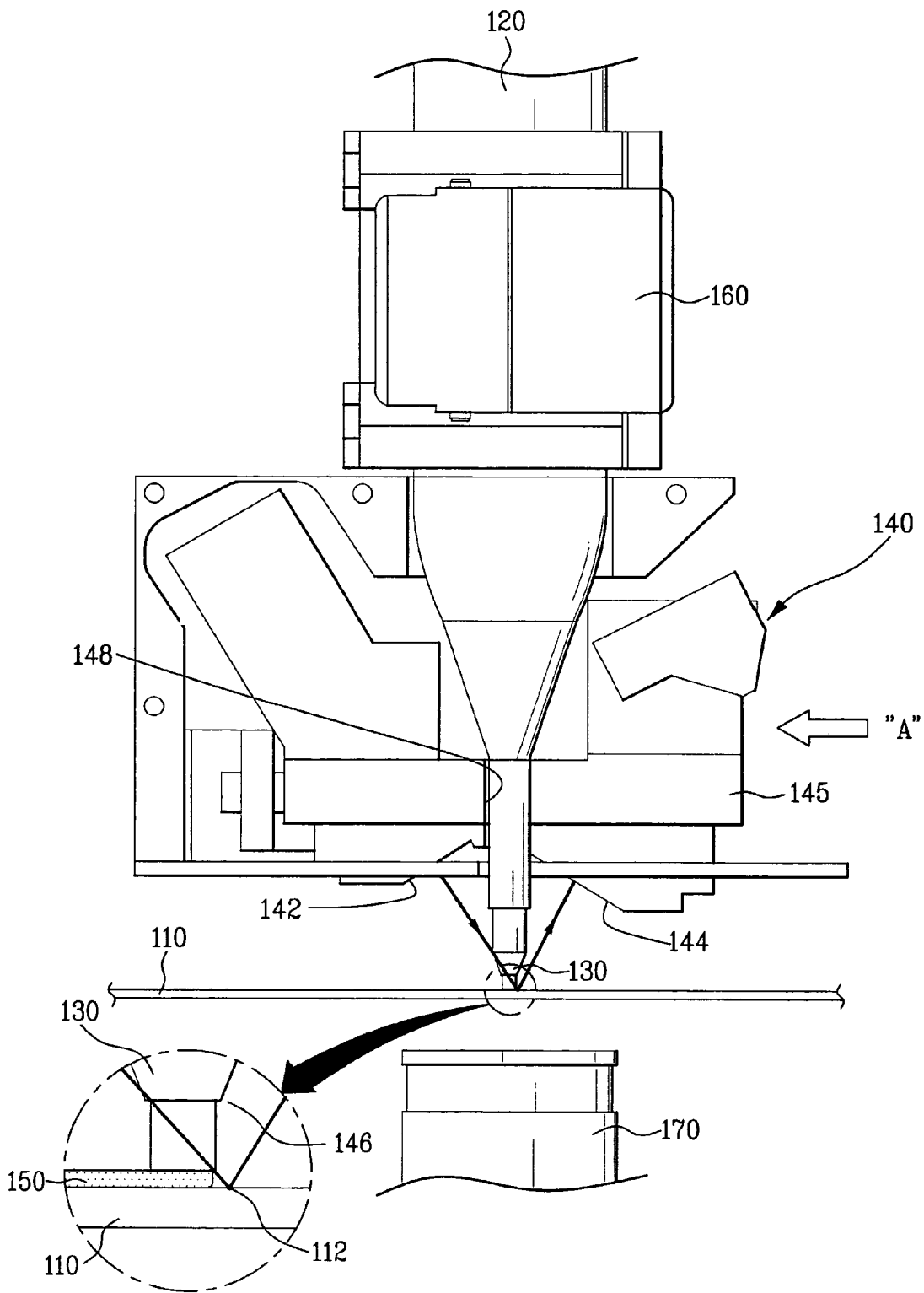
FIG. 2 is a front view illustrating key elements of a sealant dispenser according to the present invention.
Figure 3:
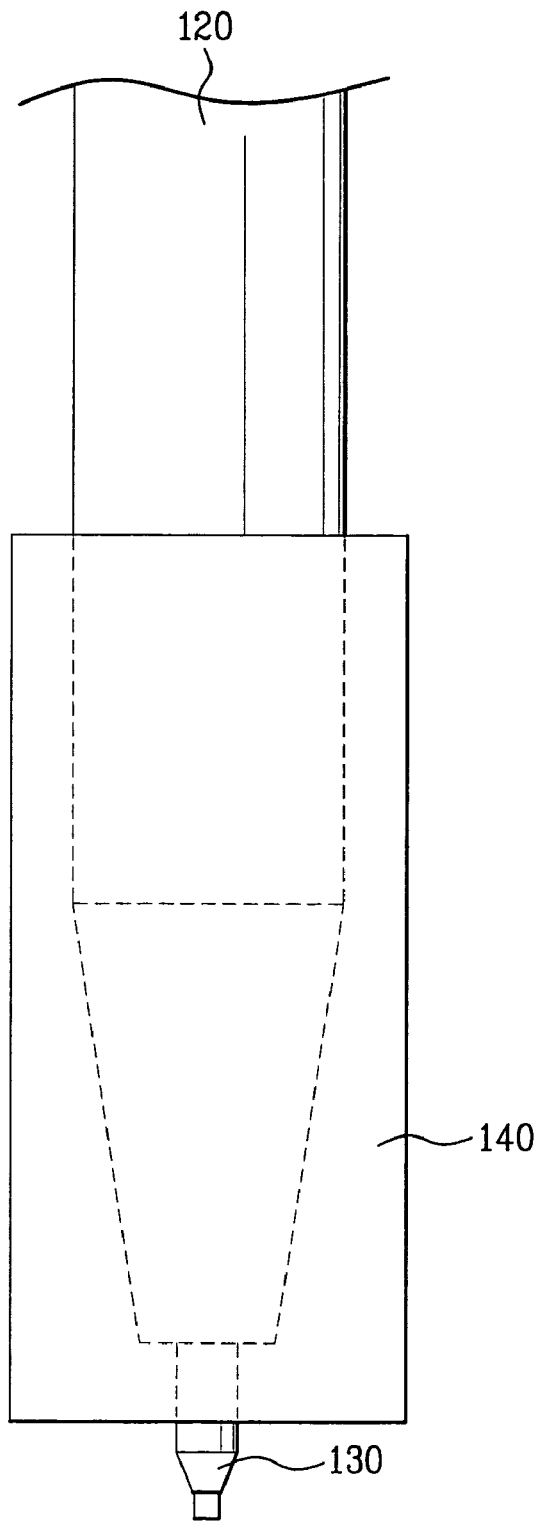
FIG. 3 is a side view of a key element taking in the direction of arrow A in FIG. 2.

FIG. 2 is a front view illustrating key elements of a sealant dispenser according to the present invention; FIG. 3 is a side view of a key element taking in the direction of arrow A in FIG. 2; and FIG. 4 illustrates a detected position of a distance sensor which is photographed by a position detecting sensor, and a location of a nozzle.

Figure 4:
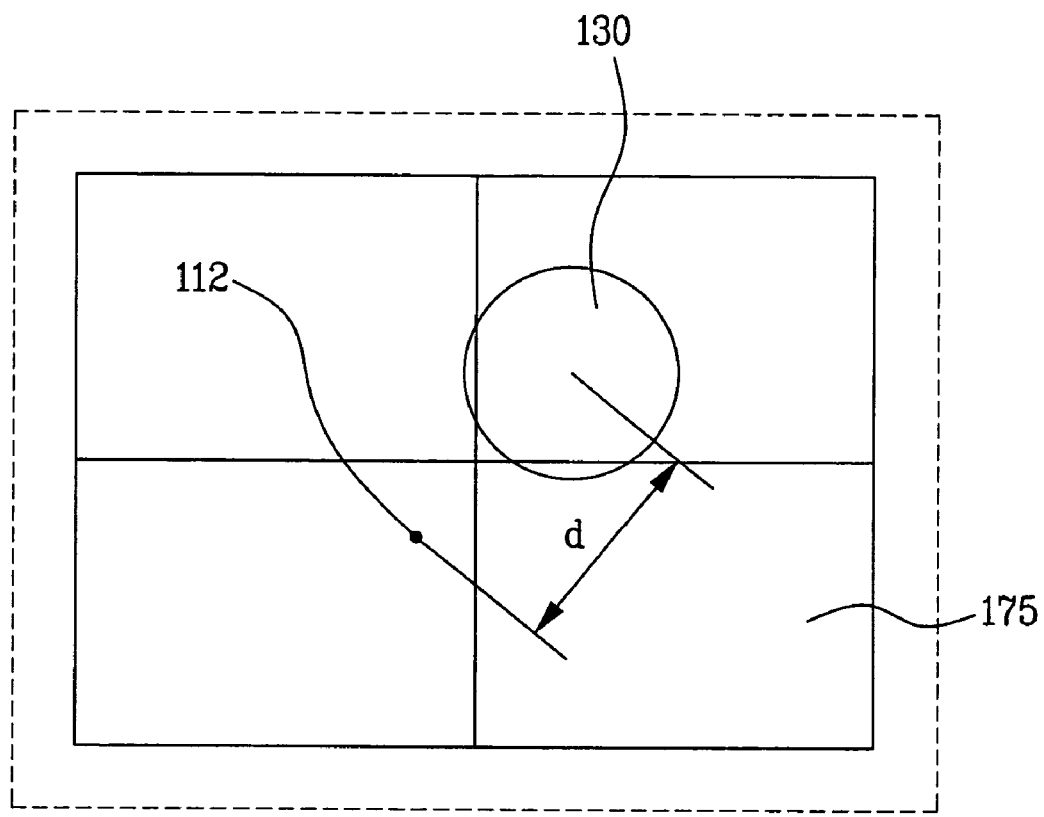
FIG. 4 illustrates a detected position of a distance sensor photographed by a position detecting sensor, and a location of a nozzle.

Referring to FIG. 2 to 4, the sealant dispenser of the present invention includes a nozzle 130 for discharging a sealant while making a relative motion to a substrate 110 mounted on a stage, a syringe 120 coupled to the nozzle 130, for storing the sealant, and a distance sensor 140 installed on both sides of the lower portion of the syringe 120, for measuring a vertical distance from the principal plane of the substrate 110 to an outlet of the nozzle 130.

The syringe 120 for storing a sealant is in conical shape of which the inside diameter decreases in the downward direction, and is installed perpendicularly to the surface of the substrate 110. Also, the nozzle 130 is coupled to one end of the syringe 120, and the outlet of the nozzle 130 is installed in such a manner to have substantially the same central axis with the syringe 120.

The sealant 150 in the syringe 120 travels along a straight flow path and is discharged from the nozzle. In result, the response speed of the sealant is increased according to a positive or negative pressure signal of a controller that controls the amount of the sealant to be applied, and the sealant can be applied to an accurate position on the substrate. Especially, since the start point and the end point of dispensing are set precisely, defect rate can be reduced markedly.

The distance sensor 140 includes a light emitting part 142 for emitting a laser beam toward the substrate 110, a light receiving part 144 for receiving a reflected laser beam from the substrate 110, and a sensor supporting part 145 for supporting the light emitting part 142 and the light receiving part 144.

The sensor supporting part 145 is installed above the light emitting part 142 and the light receiving part 144, encompassing the lower portion of the syringe 120. And, the sensor supporting part 145 is provided with a coupling hole 148 between the light receiving part 144 and the light emitting part 142, so that the nozzle 130 passing through the coupling hole 148 is located between the light receiving part 144 and the light emitting part 142.

Optionally, the sensor supporting part 145 can have a first sensor support supporting the light receiving part 144 and a second sensor support supporting the light emitting part 142. That is, the light receiving part 144 and the light emitting part 142 are separately installed on both sides of the lower portion of the syringe, and the lower portion of the syringe mounted with the nozzle is installed between the light receiving part 144 and the light emitting part 142.

Apart from the above constitutional elements, the present invention also includes a head unit structure in which the focal point of a laser beam emitted form the distance sensor, the nozzle, and the syringe are serially arranged on the same axis.

As can be seen in FIG. 3, the light emitting part and the light receiving part of the distance sensor 140, and the syringe 120 are aligned in parallel to the principal surface of the substrate. In detail, if seen in the direction of arrow A in FIG. 2, the distance sensor 140 is installed symmetrically around the center of the syringe.

Preferably, the light emitting part 142 and the light receiving part 144 of the distance sensor 140 are combined as one body. However, this is for illustrative purposes only and the present invention is not limited thereto. As aforementioned, therefore, it is possible to install the light transmitting part and the light receiving part separately from each other, and put the nozzle therebetween.

The distance sensor 140 measures a vertical distance between the nozzle 130 and the substrate 110 to which the sealant 150 is applied. To this end, the light emitting part 142 of the distance sensor 140 emits a laser beam towards the substrate 110, and the light receiving part 144 receives a reflected laser beam from the substrate 110.

If the vertical distance between the substrate 110 and the nozzle 130 is changed due to a flexure on the surface of the substrate 110, the height from a point of laser beam reflection is changed. Consequently, not only the laser beam is received at a different position on the light receiving part 144, but also the phase of the laser beam is changed. Based on these changes, the distance sensor 140 measures the vertical distance from the nozzle 130 and the substrate 110.

The measured vertical distance between the nozzle 130 and the substrate 110 is sent to a controller (not shown). Then, the controller (not shown) moves the nozzle 130 and the substrate 110 relatively to each other until the vertical distance has a predetermined value. Examples of a driving means (not shown) for moving the substrate and the nozzle include a linear motor and a servomotor.

Meanwhile, as shown in FIG. 2, a measuring point 112 on the substrate 110 from which a laser beam 146 is reflected is disposed a predetermined distance away from a position where the sealant 150 is applied. If the measuring point 112 and the position to which the sealant 150 is applied are coincident, the distance sensor 140 is interfered with its distance measurement by the sealant 150 applied to the substrate 110. Thus, it is important that the measuring point 112 and the nozzle 130 are spaced apart at least at a minimum distance for the sealant not to interfere with the laser beam. Moreover, the measuring point 112 is preferably located on a front end of the nozzle, along the direction of the sealant application.

However, the above-described embodiments are merely exemplary and are not to limit the present invention. In effect, the measuring point and the position to which the sealant is applied can be located within a predetermined allowable range. Also, the measuring point can be located in any position close to the nozzle, along the direction of the sealant application.

Furthermore, a position detecting sensor 170 is installed below the substrate 110 and detects a horizontal distance between the nozzle 130 and the measuring point in which the laser beam emitted from the distance sensor 140 is reflected. Precisely speaking, the position detecting sensor 170 and the nozzle 130 are located at the opposite sides with respect to the substrate 110.

Although a camera is preferably used as the position detecting sensor 170, any type of sensor capable of detecting the position of the nozzle and the measuring point can be utilized.

As depicted in FIG. 4, a screen 175 photographed by the position detecting sensor 170 displays the nozzle and the measuring point.

Since the substrate 110 coated with the sealant 150 is a transparent glass, the measuring point 112 and the nozzle 130 are projected onto the substrate 110. Hence, the position detecting sensor 170 regards a position on the substrate 110 where the nozzle 130 is projected as a place where the sealant 150 should be applied, and detects a distance d between the measuring point 112 and the nozzle 130.

If the distance d between the measuring point 112 and the nozzle 130 is outside the predetermined allowable range, an adjusting part 160 mounted on the head unit adjusts the position of the syringe coupled to the nozzle.

Actually, the adjusting part 160 is connected to the syringe and minutely adjusts the coupling position of the syringe. The adjusting part 160 includes a motor to be able to adjust the coupling position and angle of the syringe 120.

Alternatively, if the nozzle is stopped, a stage (not shown) supporting the substrate can be driven to adjust the horizontal distance between the nozzle and the substrate.

Figure 5:
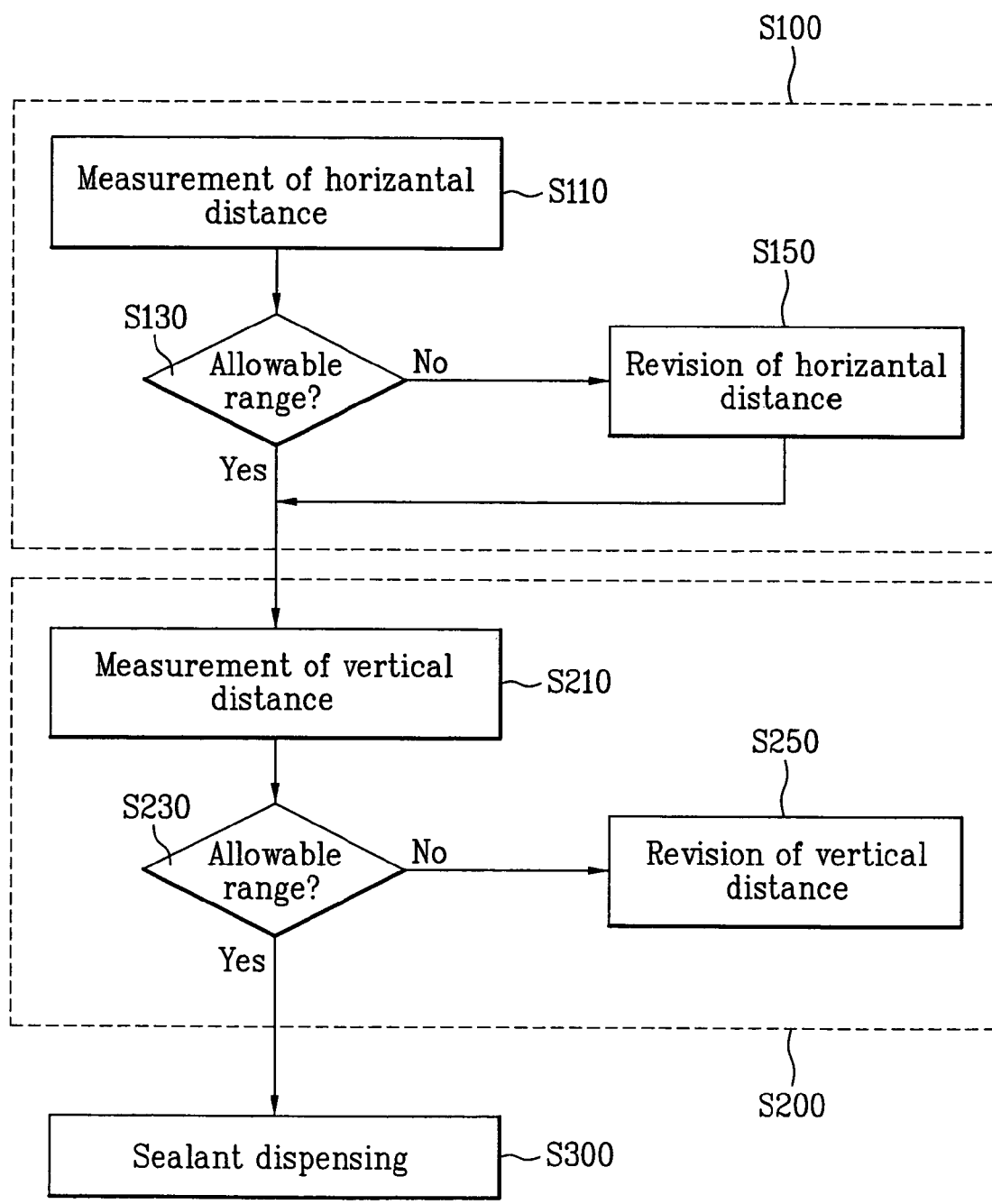
FIG. 5 is a flow chart explaining a control method of a sealant dispenser according to the present invention.

FIG. 5 is a flow chart explaining a control method of the sealant dispenser according to the present invention. The control method of the sealant dispenser will now be described in greater detail below.

As can be seen in FIG. 5, the control method of the sealant dispenser is largely divided into three steps: a first set-up step (S100) performed by the position detecting sensor, for setting or specifying a horizontal position of the nozzle on the principal plane of the substrate; a second set-up step (S200) performed by the distance sensor, for setting a vertical distance between the substrate and the nozzle; and a sealant dispensing step (S300) for dispensing or applying a sealant to the position set in the first and second steps.

In the first set-up step (S100), when the syringe descends, the nozzle coupled to the syringe moves close to the surface of the substrate. Here, it is also acceptable for the nozzle to touch the surface of the substrate.

Then, the position detecting sensor installed below the substrate photographs the measuring point on the substrate in which the laser beam reflects and the position of the nozzle, to detect the horizontal distance between the measuring point and the nozzle (S110).

Once the horizontal distance between the nozzle and the measuring point is detected, it is decided whether the measured horizontal distance is within the predetermined allowable range (S130).

Here, the allowable range indicates a user-specified range for an appropriate distance between the measuring point and the nozzle. Preferably, the allowable range is set up differently, depending on a kind of the sealant used and pressure/speed of dispensing the sealant.

If a result of the first decision in step S130 tells that the distance between the measuring point and the nozzle is within the allowable range, the method proceeds to a second set-up step for setting the vertical distance between the nozzle and the substrates (S200).

On the other hand, if the horizontal distance between the measuring point and the nozzle is outside the allowable range, the position of the nozzle is revised (S150). In this revision step, the adjusting part mounted on the head unit revises the position of the syringe to make sure that the horizontal distance between the measuring point and the nozzle falls within the allowable range. After revising the position of the syringe, it is preferable to measure the horizontal distance between the measuring point and the nozzle again.

When the first set-up step (S100) for setting the horizontal position of the nozzle on the surface of the substrate is over, the method proceeds to the second set-up step (S200) for setting the horizontal distance between the substrate and the nozzle.

In the second set-up step (S200), the distance sensor on the circumference of the lower portion of the syringe measures the vertical distance between the substrate and the nozzle (S210). Because the procedure associated with the measurement of the vertical distance has been already described referring to the constitutional elements of the distance sensor, it will not be explained here.

Once the vertical distance is measured, it is decided as a second decision step whether the measured vertical distance falls within the allowable range (S230). If a result of the second decision tells that the vertical distance is within the allowable range, the sealant is discharged (or dispensed) through the outlet of the nozzle (S300).

However, if a result of the second decision tells that the vertical distance is outside the allowable range, the vertical distance between the nozzle and the substrate is revised (S250).

In the revision step S250, either the syringe coupled to the nozzle can be moved vertically with respect to the surface of the substrate, or the other way round (i.e., the substrate can be moved vertically with respect to the nozzle). Either way, the vertical distance between the substrate and the nozzle must maintain a constant value.

When the vertical distance between the nozzle and the substrate falls within the allowable range through the revision, the sealant is discharged (or dispensed) through the outlet of the nozzle (S300). During the sealant dispensing step (S300), the syringe and the nozzle dispense the sealant while moving around substantially the same pivot.

The sealant dispenser and its control method have the following advantages.

Firstly, the syringe and the nozzle have substantially the same pivot according to the principles of the present invention, so that the flow path of the sealant becomes a straight line, which in turn lowers the pressure required for discharging (or dispensing) the sealant. This means that diverse kinds of sealants including a highly viscous sealant can be utilized.

Secondly, the distance between the measuring point on the substrate in which the laser beam is reflected and the position to which the sealant is applied is minimized, so that the sealant can be applied more precisely.

Thirdly, since the flow path of the sealant is a straight line, the response speed of the sealant to be dispensed is increased. Thus, a precise amount of the sealant can be applied to an accurate position. Especially, by setting the start point and the end point of dispensing more precisely, the defect rate is reduced markedly.

Fourthly, by setting the distance between the nozzle and the distance sensor within the allowable range, the application of the sealant can be controlled more precisely, and replacement of the syringe can be done easily and quickly.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A sealant dispenser, comprising:
   a stage on which a substrate is mounted;
   a nozzle dispensing a sealant while moving relative to the substrate;
   a syringe storing the sealant therein and coupled to the nozzle, wherein the syringe and an outlet of the nozzle are aligned along substantially a same central axis;
   a distance measuring device, installed on different sides of a lower portion of the syringe, to measure a vertical distance between a front surface of the substrate and the outlet of the nozzle, wherein the distance measuring device comprises a light emitting part, a light receiving part, and a sensor supporting part for supporting the light emitting part and the light receiving part into one body provided as a single integral unit, the sensor supporting part having a coupling hole disposed between the light emitting part and the light receiving part through which the nozzle passes.

2. The sealant dispenser of claim 1, further comprising:
   an imaging sensor, mounted under the stage, to capture an image representing a location of the nozzle coupled to the syringe and a location of a measuring point at which light from the light emitting part is reflected from the substrate, wherein the imaging sensor determines a relative position of the nozzle to the measuring point.

3. The sealant dispenser of claim 2, further comprising:
   a position adjusting device, mounted on a support, to adjust a position of the syringe coupled to the nozzle.

4. The sealant dispenser of claim 1, further comprising an elevation control device for controlling a distance between the nozzle and the substrate.

5. The sealant dispenser of claim 4, wherein the distance measuring device determines the distance between the nozzle and the substrate based on a phase difference of light received by the light receiving part as the substrate is moved relative to the nozzle.

* * * * *